Figure 1:
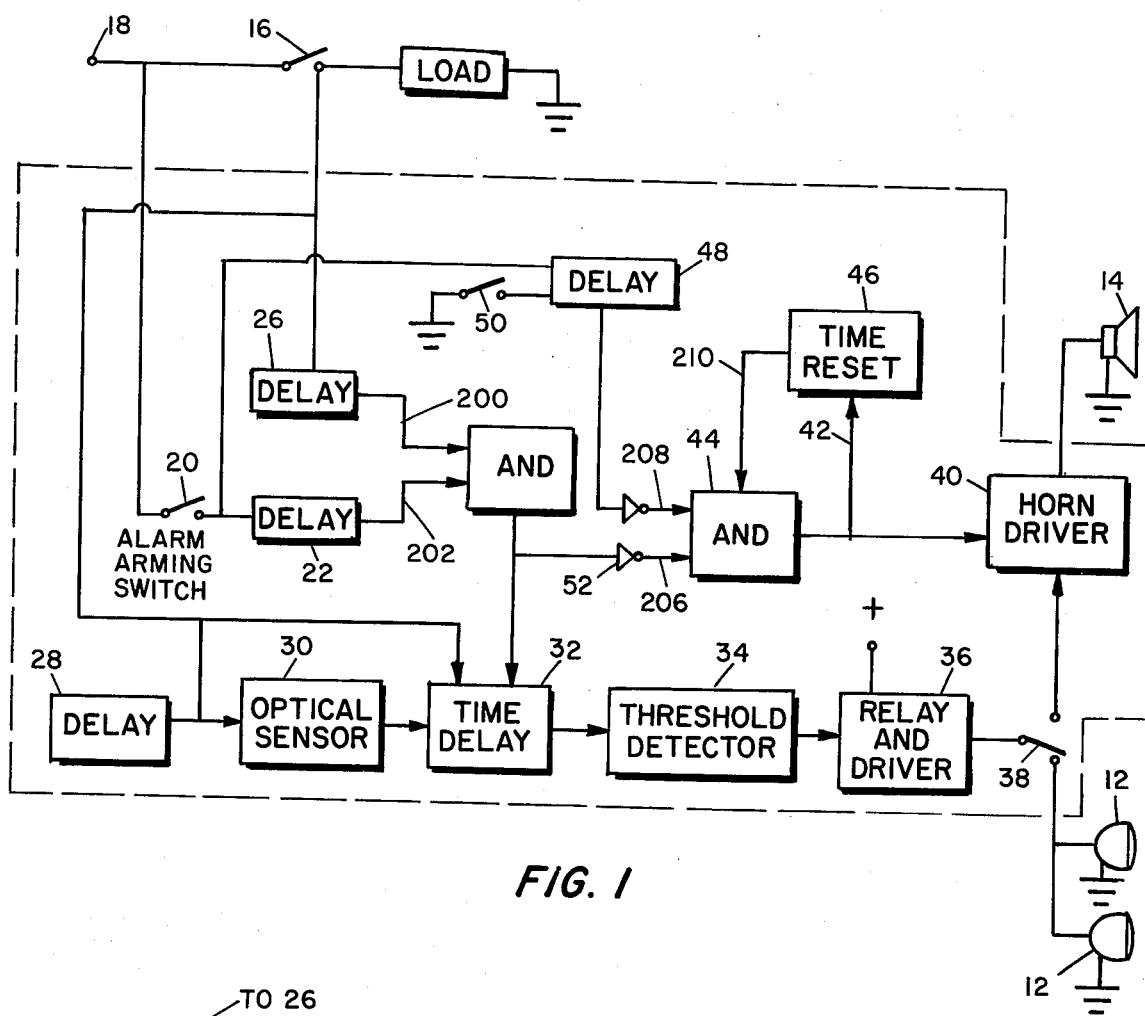

United States Patent [19]

Yamamoto

[11] 4,220,947
[45] Sep. 2, 1980

[54] HEADLAMP AND SECURITY ALARM CONTROL SYSTEM

[76] Inventor: Yujiro Yamamoto, 1880 Park Newport, Newport Beach, Calif. 92660

[21] Appl. No.: 932,467

[22] Filed: Aug. 10, 1978

[51] Int. Cl.³ .................... B60R 25/10; B60Q 1/08
[52] U.S. Cl. ........................ 340/63; 307/10 AT; 307/10 LS; 315/83; 340/52 D
[58] Field of Search ............ 340/52 D, 63, 64; 307/10 AT, 10 LS; 315/82, 83

[56] References Cited

U.S. PATENT DOCUMENTS

| | | | |
|---|---|---|---|
| 3,037,144 | 5/1962 | La Mantia | 315/83 X |
| 3,349,281 | 10/1967 | Collins | 315/83 |
| 3,628,085 | 12/1971 | Brock | 315/82 |
| 3,723,807 | 3/1973 | Tozzi | 315/83 |
| 3,769,519 | 10/1973 | Adamian | 307/10 LS |
| 3,840,777 | 10/1974 | Brock et al. | 315/82 |
| 3,956,732 | 5/1976 | Teich | 340/64 |
| 3,993,914 | 11/1976 | Conrad et al. | 307/10 LS |

*Primary Examiner*—John W. Caldwell, Sr.
*Assistant Examiner*—Joseph E. Nowicki
*Attorney, Agent, or Firm*—Grover A. Frater

[57] ABSTRACT

A headlamp control system and anti-theft alarm system share a relay which powers the headlamp circuit of a vehicle in one position and enables use of the horn in an alarm circuit in the other position. Delay times operate at ignition switch turn-off to control headlamps, if illuminated, and to permit arming of the alarm and exiting the vehicle before the alarm becomes fully active.

17 Claims, 2 Drawing Figures

HEADLAMP AND SECURITY ALARM CONTROL SYSTEM

This invention relates to improvements in automobile headlight controls and alarm systems.

BACKGROUND OF THE INVENTION

Automatic shut-off of automobile headlamps after turn-off of ignition switch was developed as an aid to automobile operators who forget to turn off the lights. That initial development was subsequently expanded to include light level sensing and automatic turn-on and turn-off of head lamps with light level. The form of head lamp control units of the past, and their cost, has operated for the most part to limit their application to higher priced automobiles and to factory installation as original equipment.

On the other hand, anti-theft alarm systems for automobiles have not been furnished as original equipment of automobiles, partly because those systems have required special components and even more because the general knowledge of system operation that would follow standardization and volume production would simply invite, and probably result in, development of systems to defeat the alarm. Instead, anti-theft alarm systems have been generally restricted to do-it-your-self installations sometimes with kits of parts but more often of home-made design.

SUMMARY OF THE INVENTION

It is an object of this invention to provide an improved automatic headlamp controller and an improved anti-theft alarm system for motor vehicles.

One object is to provide such a controller and such a system in a combined form that is capable of production at low cost and which is easily added as a reasonably priced optional accessory for new vehicles and an after-sale accessory for other vehicles.

A major advantage and object of the invention is that the highest cost components, ignition switch, headlamp switch, headlamps, horn, and most interconnecting wiring are part of standard vehicles. The remaining components, especially those that are peculiar to the alarm system, are relatively inexpensive. Thus, only one model of the unit need be produced even if only one of the two systems, headlamp control or alarm system, is to be used.

The automatic headlamp controller incorporates a novel, improved timing scheme which accomplishes delayed turn-off of headlamps in darkness after ignition switch turn off, fast turn-on in going from light to dark, and delayed turn-off in going from dark to light. To provide such an improvement is another object of the invention.

Still another object is to provide a headlamp controller which responds to the integrated value of light input from a wide field of view whereby it is rendered relatively insensitive to point sources of light and whereby mounting options within a vehicle are greatly increased.

These several objects and advantages are accomplished, in part, by the provision of a headlamp controller in which a fast charge, slow discharge circuit is made to operate a headlamp power control switch. A light sensitive element controls fast charging of the fast charge, slow discharge circuit. A second slow discharge circuit operates to permit the light sensitive element to retain its control function for a predefined time following turn-off of the vehicle's ignition switch. The alarm system utilizes the second slow discharge circuit of the headlamp controller to provide a time interval after ignition shut-off during which the alarm system may be armed. Arming of the alarm during that interval activates the headlamp controller so that the headlights are illuminated, or remain illuminated, for a period long enough to permit the vehicle occupants to exit the vehicle and close its doors. After that period has passed, actuation of a door switch or other sensor results in sounding of the alarm. Opening a given one of the doors with a key disarms the alarm.

THE DRAWINGS

Figure 2:
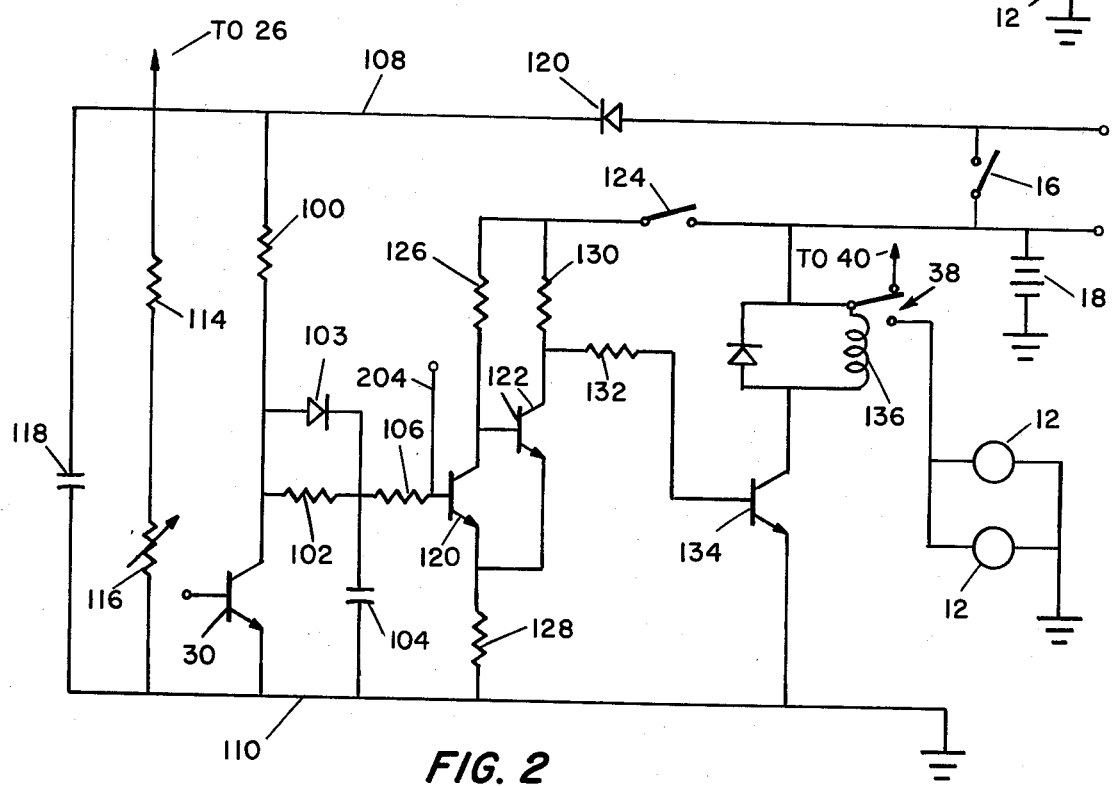

In the drawings:

FIG. 1 is a block diagram of a system embodying the combined headlamp control and alarm system; and FIG. 2 is a circuit diagram of a preferred form of headlamp control according to the invention.

The preferred embodiment of FIG. 1 includes a combined headlamp control and anti-theft alarm unit 10 comprising those elements contained within the dashed line. It also includes a set of headlamps 12, a horn 14, an ignition switch 16 and an electrical power source 18.

The ignition switch 16 is usually a multiple contact, multiple position switch which, when closed, connects the ignition circuit and a number of assessories, such as the radio and heater fan, to the battery in a key position intermediate the "off" and "start" positions. It is selected in the preferred embodiment because it is closed whenever the engine is to run and is open whenever the engine is to remain stopped.

Unit 10 includes an alarm arming switch 20 in the form of a manually operated, momentary contact switch unit 22. The output of the timer, after momentary actuation of switch 20, is a high signal which is applied for some interval to one input of AND gate 24. A second timer 26 has its input connected to one output of a time delay unit 28 and its output connected to the other input of AND gate 24.

The other output of time delay unit 28 is connected to an optical sensor 30 and to a time delay unit 32. The output of the latter is connected to a threshold detector 34. The detector in turn is connected to a relay driver and relay coil unit 36. The relay coil actuates a single pole, double throw contact set 38 one pole of which is connected to headlamp set 12 and the other pole of which is connected to a horn driver 40. The output of the latter is connected to horn 14.

The horn driver connects the power source to the horn through driver unit 36 if the contact set 38 is in the upper "horn" position and if an enabling signal is applied to horn driver 40 control line 42 by the resetable AND gate 44 to which output line 42 is connected. Gate 44 responds to two inputs and a reset line 46. One input of gate 44 is connected through a time delay unit 48 to an intrusion sensor shown here as a door switch 50. The other input of the gate 44 is connected to the output of AND gate 24 through an inverter 52. The output of AND gate 24 is also connected to an input of timer unit 32.

A reset timer in the form of a one-shot, multivibrator responds to a high at the output of gate 44 to generate a long pulse which is applied to reset line 46. The gate 44 is reset by the trailing edge of the pulse.

Delay circuits 22, 26 and 48 employ fast charge, slow discharge circuits like that of delay unit 32. The latter is shown in detail in FIG. 2.

The time delay circuit 32 of FIG. 1 appears near the left in FIG. 2 and it comprises resistor 100, resistor 102 and capacitor 104 which are connected in series, in that order, from positive line 108 to negative line 110. It also includes a switch, which in this case is the optical sensor 30 comprising a photo-sensitive transistor which is connected in parallel with the series combination of resistor 102 and capacitor 104. The collector of the transistor 30 is connected to the junction of resistors 100 and 102. When transistor 30 is conducting, the junction of resistors 100 and 102 and the emitter will have a potential a little above the negative line 110. Capacitor 104 will not be fully charged if the transistor 30 is switched to its conducting state. If the transistor is switched to its non-conducting state, the capacitor charge will increase relatively rapidly. Having been charged, it will discharge through resistor 102 and transistor 30 if the latter is made conductive. The capacitor is connected to a threshold detector 34 through a coupling resistor 106. The timer 32 consists of the three resistors 100, 102 and 106, the capacitor 104 and the series circuit formed by resistor 106, the base-emitter junction of transistor 120 and resistor 28. That series circuit is in parallel with resistor R102 when the transistor 30 is conductive to increase the discharge rate of the capacitor.

To increase the charging rate of capacitor 104 without changing its discharge rate when detector 30 is rendered conductive, the preferred embodiment includes a diode 103 in parallel with resistor 102 polarized so that resistor 102 is shorted during charging of capacitor 104 and is not shorted during discharge of the capacitor.

Timer 28 of FIG. 1 is formed by resistor 114, variable resistor 116 and capacitor 118 at the left in FIG. 2. The two resistors are connected in series between the positive line 108 and the negative line 110. That series combination is connected in parallel with the capacitor 118. Positive line 108 is connected to the positive side of battery 18 through the ignition switch 16 and a diode 120. During periods when the ignition switch 16 is closed, capacitor 118 will be charged to the potential of battery 18 through the ignition switch and the diode. When the ignition switch is opened, capacitor 118 will discharge through resistors 114 and 116. As it discharges, it will maintain line 108 positive and will serve as a source of power for time delay circuits 26 and 32.

The threshold detector 34 is formed by transistors 120 and 122, a switch 124 and four resistors identified by the reference numerals 126, 128, 130 and 132, respectively. Swotch 124, resistor 126, the collector to emitter circuit of transistor 120 and the resistor 128 are connected in series, in that order, from the junction between the positive terminal battery 18 and ignition switch 16 to ground. The base for transistor 120 is connected to resistor 106. The collector of transistor 120 is connected to the base of transistor 122 and the emitter of transistor 120 is connected to the emitter of transistor 122. The collector is connected through resistor 130 to the junction between switch 124 and transistor 126. One side of resistor 132 is connected to the collector of transistor 122. When the switch 124 is closed, that circuit operates like a Schmidt trigger. Its output appears at the other end of resistor 132 which is connected to the base of a transistor 134 whose emitter is connected to the ground line 110 and whose collector is connected to the junction between the ignition switch 16 and the positive terminal of battery 18 through the parallel combination of the coil 136 of the relay 38 and a back-biased diode 138 which provides a path for current that is developed in the relay coil 136 when the coil is subjected to a collapsing field. Transistor 134 is a switching transitor which, together with the relay coil 136 and diode 138, constitute the relay and driver 36 of FIG. 1.

The light sensor 30 that is selected for use in the preferred embodiment is shown as a transistor whose base terminal is unconnected. That transistor is switched to its conducting state when subjected to light, and it is switched to its non-conducting state when the light level is below some predetermined value. Devices of that kind are available which will switch at different ambient light levels. In addition to that, the light level at which switching is accomplished can be controlled by employing filters between the device and the light source.

The headlamps 12 are energized through the apparatus shown in FIG. 2 only when coil 136 of the relay is energized to complete a circuit from the positive terminal battery 18 to the headlamps. The relay coil 136 is energized only when the relay driver transistor 134 is in its conducting state. The remainder of the circuit is arranged so that transistor 134 is rendered conductive shortly after the light level reaching the optical sensor 30 has fallen below the pre-established value. The driver transistor will remain conductive while the light level remains below that predetermined value, while the ignition switch 16 is closed, and for some selected period following the opening of the ignition switch. In this circuit, the length of the time that the driver transistor 134 remains conductive and the headlamps remain lighted following opening of the ignition switch 17 may be adjusted by adjustment of the value of variable resistor 116.

When the ignition switch 16 is open, any charge on capacitor 118 will be dissipated through the series combination of resistors 114 and 116. Any charge on capacitor 104 will be dissipated through the series combination of resistors 102, 100, 114 and 116. Thus it is, after the car has been standing for some time with its ignition turned off, the circuit shown in FIG. 2 will be completely de-energized and the relay contactor 38 will be in its uppermost position in contact with the terminal leading to the horn driver 40 of FIG. 1.

When the ignition switch 16 is closed, capacitor 118 is connected directly across the automobile battery 18 except for the small impedance that is presented by the diode 120. Accordingly, the capacitor 118 is charged immediately to a value almost equal to the voltage of the automobile battery. Capacitor 104 will be charged to substantially the voltage of the automobile battery by current that flows through the diode 120 and through resistors 100 and 102 provided that the light level is below the switching level of optical sensor 30 such that the sensor 30 is switched off. The capacitor 104 charges relatively fast, and as soon as it has reached some predetermined threshold level, its potential, which is applied to the base of transistor 120 through the coupling resistor 106, will cause that transistor to be turned on. Resistor 128 has a value much less than that of resistor 126. Accordingly, the potential at the collector of transistor 120 and the base of transistor 122 will be reduced to a value near zero as a consequence of which the transistor 122 will be turned off. The result of that is to raise the potential at the base of transistor 134 and that transistor will be turned on permitting current to flow through the relay coil 136. The contactor 38 is drawn to its lower contact in FIG. 2 to complete a circuit from the automobile battery 18 through contactor 38 to the headlamps 12.

If the potential at the base of transistor 120 is reduced to a value near ground potential, it will be turned off and transistor 122 will be turned on, and transistor 134 will be turned off. When resistor 134 is turned off, current flow to the relay coil 136 and to the headlamps is interrupted. Thus, when the potential at capacitor 104 is above some given value, the headlamps will be energized, and when the potential on capacitor 104 is below that value, the headlamps will be de-energized.

If, while the ignition switch is closed, the automobile is moved to a position in which the integrated light input to optical sensor 30 is above its switching level, the optical sensing transistor 30 will change to the on state. In that state, any charge in capacitor 104 will be dissipated through the combination of resistor 102 and the optical sensor 30. As a consequence of that, the potential at the base of transistor 120 will be lowered and the headlights will be extinguished. If the ignition switch is turned off while the optical sensor 30 is subjected to light level above its switching level, it will be switched to its on condition. Capacitor 104, if charged, will discharge through the combination of sensor 30 and resistor 102. Capacitor 118, which is held at a level near battery potential when the ignition switch is closed, begins to discharge through each of two parallel paths. It discharges through the combination of resistors 114 and 116 and it also discharges through the combination of resistor 100 and the optical sensor 30. Discharge through the first of those paths is relatively slow, but discharge through the combination of resistor 100 and the optical sensor is rapid. However, if the ignition switch is turned off at a time when the optical sensor 30 is subjected to a light level below its switching value, capacitor 118 cannot discharge through the series combination of resistor 100 and the optical sensor 30. Instead, capacitor 104, which will have been charged through resistors 100 and 102, will begin to discharge as current flows from the capacitor through resistors 102, 100, 114 and 116. However, capacitor 118 is also discharging through resistors 114 and 116. The voltage developed across the latter two resistors cannot be greater at any instant than the voltage across capacitor 118. The effect is that capacitor 104 is prevented from being discharged as rapidly as it was charged. The potential on capacitor 104 remains above the threshold at which transistor 120 is switched for a substantial period of time. Because of that, transistors 120 and 134 will remain on for an appreciable period of time after the ignition switch 16 is turned off. Accordingly, the headlamps will remain illuminated until capacitor 104 is discharged below the threshold level at which the Schmidt trigger formed by transistor 120 and 122 is switched. The combination of the delay circuit 28, the optical sensor 30 and the time delay circuit 32 is such that the headlamps are turned on rapidly when the car and the sensor are moved from a light to a dark place and so that the headlights remain illuminated for a substantial period of time following turn-off of the ignition switch when the car and the sensor are in the dark. The components in the Schmidt trigger can be adjusted so that there is an appreciable difference between the transistor 120 base potentials that will result in switching of that transistor. Thus it is a simple matter to control the time, following movement of the automobile to carry the sensor 30 from dark to light, at which the headlamps will be turned off.

Because of the ease with which the several time delays may be adjusted and made different with so few components, the circuit of FIG. 2 has special value as a headlamp controller independent of its utility as part of the alarm system. In the preferred embodiment, the resistors and capacitors have the value set out in the table below:

Capacitor 104, 100 mfd.
Capacitor 118, 200 mfd.
Resistor 100, 100K ohms.
Resistor 102, 100K ohms.
Resistor 106, 10K ohms.
Resistor 114, 2.2K ohms.
Resistor R3, 500K ohms.
Resistor 126, 68K ohms.
Resistor 128, 100 ohms.
Resistor 130, 2.2K ohms.
Resisotr 132, 1K ohms.
Transistor 30, 2N5777.

As indicated previously, the time delay circuits 22, 26 and 48 of FIG. 1 are similar to the time delay circuit 32 that was described in detail in connection with FIG. 2.

During periods when the ignition switch 16 is closed, the power is supplied to the time delay circuit 26 and a positive output signal is applied by one input of AND gate 24. Even after the ignition switch 16 is opened that positive signal persists for a time because of current flow from the capacitor and time delay unit 28. During that interval, the vehicle operator may elect to close the alarm arming switch 20, and if that is done, the time delay circuit 22 will be energized and a positive signal will be applied to the AND gate 24 by the output line 202 of delay circuit 22. During the interval when both of the inputs to the AND gate 24 are positive, or high, a high output appears on output line 204 and the base of transistor 120 in the Schmidt trigger in FIG. 2. The effect of that is to cause the relay and driver unit 36 to actuate the relay contact 38 so that the headlamps are illuminated and so that the horn driver 40 is not energized. The signal on line 204 is applied through the inverter 52 to one input of AND gate 44. When both inputs to the AND gate 44 are high, the output of that gate is high. The effect of that high signal is to activate the horn driver to make the horn 14 operate, provided, of course, that the contact 38 is connected to the upper horn driver contact. During the time when the AND gate 24 applies a signal to the time delay unit 32 to maintain the lights illuminated and the horn driver disabled, it matters not whether a high or a low signal is applied by line 206 to the AND gate 44. However, once the time delay units 26 and 22 have timed out, so that a low is applied by line 204 to timer 32 and the horn driver is energized, it is required that a high signal be applied to AND gate 44 by line 206, and it is for that purpose that the inverter 52 is included in that line. During the interval before the timers 22 and 26 have timed out, when there is a high signal on line 204 and the horn driver is disconnected from the power source, it matters not what signal is applied to AND gate 44 on line 208 at the output of timer 48. However, after that interval when the horn driver is connected to the power source, a low signal must appear on line 208 until a thief opens the door. Line 208 includes an inverter so the output of the timer 48 must be a high signal at all times when the alarm arming switch is closed except in the event that the thief actuates the anti-theft switch which, in this case, is the door switch 50. To permit authorized persons to open the door without tripping the alarm, the door switch is connected to the time delay unit 48 such that the timer does not time out and apply a low signal to its output line for a period long enough for that authorized person to open the alarm arming switch.

The preferred unit is arranged with an additional timer 46 which is activated by a high signal at the output of AND gate 44 and for a selected period applies a high signal by line 210 to the input line 208 to AND gate 44. The inclusion of that timer insures that the alarm will continue to sound for some period after an attempted break-in, notwithstanding that the thief has closed the door, to reopen the anti-theft, or door, switch 50. This timer is included on the assumption that sounding the alarm will frighten the thief away within a few minutes, or other short time. It resets the system so that it will sound if a second attempt is made by the same thief or another thief. Further, the second saves power and avoids creating a prolonged disturbance.

It is preferred to use a photo-transistor made to receive incident light arriving at any of a wide range of input angles. Unit 30 has that characteristic. It "sees" and responds to a wide, integrated, ambient light field instead of being responsive to input from a narrow light window. The result is that there are few limitations on the position in which the unit can be mounted. Unlike prior automotive light sensors, unit 30 can be mounted with little regard for high intensity, point sources of light. Because the unit responds to the sum of the light arriving from a wide field of view, there is little need to protect it from exposure to brightly lighted signs or to the headlamps of other cars. At the same time, the fact that the unit responds to incident light from many directions means that it can be mounted where it will not be inconvenient. It can even be placed under the vehicle dashboard, which is usually thought of as being dark. That makes it easy to mount in most vehicles and makes the invention particularly useful for the "after sale" accessory market.

In preferred form, the light sensor is provided with a light sensitive surface and is mounted such that some portion of the surface is subjected to incident light arriving at angles exceeding one hundred degrees in any direction from the perpendicular direction, and it is responsive to the integrated sum of the light reaching each portion of the sensitive surface. Such sensors so mounted are commercially available.

Although I have shown and described certain specific embodiments of my invention, I am fully aware that many modifications thereof are possible. My invention, therefore, is not to be restricted except insofar as is necessitated by the prior art.

I claim:

1. A headlamp controller for vehicles having headlamps, a headlamp switch, an ignition switch, and an electrical power source, which controller comprises:
    switch means responsive to a switching signal for permitting and preventing electrical power flow to said headlamps;
    switching signal generating means in the form of a time delay circuit operative when in a first state to cause said switch means to permit, and when in a second state to prevent power flow to said headlamps;
    state control means in the form of a light sensor, when electrically conductive, for permitting said time delay means to change at one rate from said first to said second state and, when non-conductive, to change from said first state to said second state at a slower rate; and
    maintaining means for maintaining said light sensor energized for a selected period after actuation of said ignition switch.

2. The invention defined in claim 1 in which said maintaining means comprises a capacitor, means for charging said capacitor from said electrical power source only when said ignition switch is closed, and a resistor through which energy may flow from said capacitor to said light sensor.

3. The invention defined in claim 2 in which said time delay circuit comprises a second capacitor and a series resistor connected in series across said electrical power source, and a voltage sensitive circuit connected in parallel with said second capacitor and exhibiting greater resistance than said series resistor.

4. The invention defined in claim 3 in which said light sensor exhibits lesser resistance when subjected to light and is connected in parallel circuit with said second capacitor.

5. The invention defined in claim 4 in which said switch means comprises a control circuit which switches from first to second state at one switching signal level and which switches from second to first state at a different signal level.

6. The invention defined in claim 5 which further comprises means comprising said headlamp switch for subjecting said switch means to a signal at a level sufficient to switch said control circuit to said second state notwithstanding said switching signal has a level insufficient to cause switching to said second state.

7. The invention defined in claim 5 in which said switch means further comprises a relay which, when energized, is effective to connect said headlamp to said electrical power source.

8. The invention defined in claim 6 in which said switch means further comprises a relay which, when energized, is effective to connect said headlamps to said electrical power source and, when de-energized, is effective to disconnect said headlamps from said power source.

9. The invention defined in claim 8 which further comprises a horn which sounds when electrically powered; and
    in which said relay is effective, when disconnecting said headlamps from said power source, to connect said horn in a circuit which includes said power source.

10. The invention defined in claim 9 which further comprises an alarm enabling switch; and
    delay control means responsive to actuation of said alarm enabling switch within a predetermined time following turn-off of said ignition switch for furnishing to said switch means a signal having a level sufficient to switch said control circuit to its second state.

11. The invention defined in claim 10 in which said delay control means comprises a first gate having one input connected to said capacitor first mentioned and another input connected to said alarm enabling switch.

12. The invention defined in claim 11 which further comprises an intrusion sensor and a second gate having one input connected to said intrusion sensor and the other input connected to the output of said first gate; and means responsive to the output of said second gate for enabling sounding of said horn.

13. The invention defined in claim 12 which further comprises means in the form of a timer connected to said second gate for terminating sounding of the horn after a selected interval and for resetting said timer such that the horn will resound in response to a subsequent intrusion.

14. The invention defined in claim 4 in which said light sensor is formed with a light receiving surface some portion of which is subjected to incident light arriving at angles exceeding one hundred degrees in any direction from the perpendicular direction, and is responsive to the integrated sum of the light reaching each portion of said surface whereby said sensor responds to average ambient light levels rather than point sources of light.

15. The invention defined in claim 1 in which said maintaining means is effective to maintain said light sensor energized after opening of said ignition switch and is effective to permit the time delay means to change only at a rate that is slower than said first mentioned slower rate whereby the head lamps remain illuminated longer after turn-off of the ignition switch in the dark than they remain illuminated after driving from a dark place into light.

16. For a vehicle having a battery and an ignition switch in series circuit, in combination:
   a. a first positive terminal and a second positive terminal for connection to said series circuit on the side of said ignition switch toward and away from said battery, respectively, and a negative terminal for connection to the engative side of said battery;
   b. a first series circuit connected between said second positive terminal and said negative terminal comprising a first resistor and a light sensor of the kind that exhibits resistance of lesser value when subjected to light;
   c. a second series circuit comprising a second resistor and being connected between said second positive terminal and said negative terminal;
   d. a third series circuit comprising the emitter-collector circuit of a transistor connected between said first positive terminal and said negative terminal;
   e. a fourth series circuit comprising third and fourth resistors connected from the junction of the first resistor and light sensor to the base of the transistor in that order;
   f. a first capacitor connected between the junction between the third and fourth resistors and said negative terminal;
   g. a diode connected in parallel with said third resistor in a direction of polarity to pass charging current to said first capacitor;
   h. a second capacitor connected between said second positive terminal and said negative terminal; and
   i. sensing means for sensing conduction above and below selected levels in said transistor.

17. The invention defined in claim 16 in which said sensing means comprises:
   a. a Schmidt trigger;
   b. a relay having contacts and an actuating coil;
   c. a solid state switch connected in series with said actuating coil between said first positive terminal and said negative terminal; and
   d. means for utilizing the output of the Schmidt trigger to turn said solid state switch on and off.

* * * * *